(12) United States Patent
Holmes

(10) Patent No.: US 8,944,950 B2
(45) Date of Patent: Feb. 3, 2015

(54) SYSTEM AND METHOD OF DIFFERENTIATING TORQUE BETWEEN WHEELS OF A VEHICLE

(71) Applicant: GM Global Technology Operations LLC, Detroit, MI (US)

(72) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 192 days.

(21) Appl. No.: 13/633,185

(22) Filed: Oct. 2, 2012

(65) Prior Publication Data

US 2013/0281247 A1 Oct. 24, 2013

Related U.S. Application Data

(60) Provisional application No. 61/625,976, filed on Apr. 18, 2012.

(51) Int. Cl.
*B60K 17/12* (2006.01)

(52) U.S. Cl.
USPC .......................................... 475/150; 475/154

(58) Field of Classification Search
USPC .......................................... 475/149–151, 154
See application file for complete search history.

(56) References Cited

U.S. PATENT DOCUMENTS

| | | | | |
|---|---|---|---|---|
| 6,749,532 B2* | 6/2004 | Wachauer | ...................... | 475/151 |
| 7,410,017 B2* | 8/2008 | Gradu | ............................ | 475/150 |
| 8,343,000 B2* | 1/2013 | Karlsson et al. | ............. | 475/150 |
| 2003/0203782 A1* | 10/2003 | Casey et al. | .................. | 475/150 |
| 2012/0129644 A1* | 5/2012 | Palfai et al. | .................. | 475/150 |
| 2013/0225348 A1* | 8/2013 | Yang | ............................. | 475/150 |

* cited by examiner

*Primary Examiner* — Jacob S Scott
(74) *Attorney, Agent, or Firm* — Quinn Law Group, PLLC

(57) ABSTRACT

An electric drive unit (EDU) is configured for driving a first and second wheel of a vehicle. The EDU includes a rotor, a stator, a first planetary gear set, a second planetary gear set, and a pair of engagement mechanisms. The first planetary gear set is operatively connected to the rotor and rotates about the drive axis in response to rotation of the rotor to transmit torque to the first wheel. The second planetary gear set is operatively connected to the rotor and rotates about the drive axis in response to rotation of the rotor to transmit torque to the second wheel. Rotation of the rotor causes each of the planetary gear sets to rotate about the drive axis. Each engagement mechanism is selectively engages a respective one of the planetary gear sets to vary the torque transmitted to the respective wheel.

8 Claims, 2 Drawing Sheets

SYSTEM AND METHOD OF DIFFERENTIATING TORQUE BETWEEN WHEELS OF A VEHICLE

CROSS-REFERENCE TO RELATED APPLICATIONS

This application claims the benefit of U.S. Provisional Application No. 61/625,976 filed on Apr. 18, 2012, which is hereby incorporated by reference in its entirety.

TECHNICAL FIELD

The present disclosure relates to a system and a method of differentiating torque between wheels of a vehicle with an electric or hybrid electric powertrain.

BACKGROUND

A powertrain of a typical four-wheel-drive vehicle includes an engine, a transmission, a transfer case, front and rear driveshafts, and front and rear differentials. The transfer case is operatively connected to the transmission to direct power to front and/or rear wheels. The front driveshaft operatively connects the transfer case to the front differential and the rear driveshaft operatively connects the transfer case to the rear differential. The front differential drives the front wheels and the rear differential drives the rear wheels. During certain driving conditions, the transfer case is operated to direct power to only the rear wheels. In other driving conditions, i.e., in four-wheel-drive, the transfer case is operated to direct power to both the front and rear wheels.

SUMMARY

An electric drive unit is configured for driving a first wheel and a second wheel of a vehicle. The electric drive unit includes a rotor, a stator, a first planetary gear set, a second planetary gear set, and a pair of engagement mechanisms. The stator radially surrounds the rotor about a drive axis. The rotor rotates about the drive axis, relative to the stator. The first planetary gear set is operatively connected to the rotor and is rotatable about the drive axis in response to rotation of the rotor about the drive axis to transmit torque to the first wheel. The second planetary gear set is operatively connected to the rotor, opposite the first planetary gear set, and is rotatable about the drive axis in response to rotation of the rotor about the drive axis to transmit torque to the second wheel. The rotor is operatively disposed along the drive axis between the first planetary gear set and the second planetary gear set. Rotation of the rotor causes each of the planetary gear sets to rotate about the drive axis. Each engagement mechanism is configured to selectively engage a respective one of the first and second planetary gear sets to vary the torque transmitted to the respective wheel.

A vehicle includes a first wheel, a second wheel, a controller, and an electric drive unit. The controller is configured for transmitting a signal. The electric drive unit includes a rotor, a stator, a first planetary gear set, a second planetary gear set, and a pair of engagement mechanisms. The stator radially surrounds the rotor about a drive axis. The rotor rotates about the drive axis, relative to the stator. The first planetary gear set is operatively connected to the rotor and is rotatable about the drive axis in response to rotation of the rotor about the drive axis to transmit torque to the first wheel. The second planetary gear set is operatively connected to the rotor, opposite the first planetary gear set, and is rotatable about the drive axis in response to rotation of the rotor about the drive axis to transmit torque to the second wheel. The rotor is operatively disposed along the drive axis between the first planetary gear set and the second planetary gear set. Rotation of the rotor causes each of the first and second planetary gear sets to rotate about the drive axis. The pair of engagement mechanisms are operatively connected to the controller. Each engagement mechanism is configured to selectively engage a respective one of the first and second planetary gear sets to vary the torque transmitted to the respective wheel in response to receiving a signal from the controller.

A method of vectoring torque between a first wheel and a second wheel of a hybrid vehicle is provided. The method includes transmitting power from an energy storage device to a motor of an electric drive unit. The motor is operated to rotate a first planetary gear set and a second planetary gear set about a drive axis. An engagement mechanism corresponding to one of the first and second planetary gear sets is selectively actuated to in turn transmit torque from the motor to the corresponding wheel.

The above features and advantages and other features and advantages of the present invention will be readily apparent from the following detailed description of the preferred embodiments and best modes for carrying out the present invention when taken in connection with the accompanying drawings and appended claims.

BRIEF DESCRIPTION OF THE DRAWINGS

Referring now to the figures, which are exemplary embodiments and wherein like elements are numbered alike.

DETAILED DESCRIPTION

Figure 1:
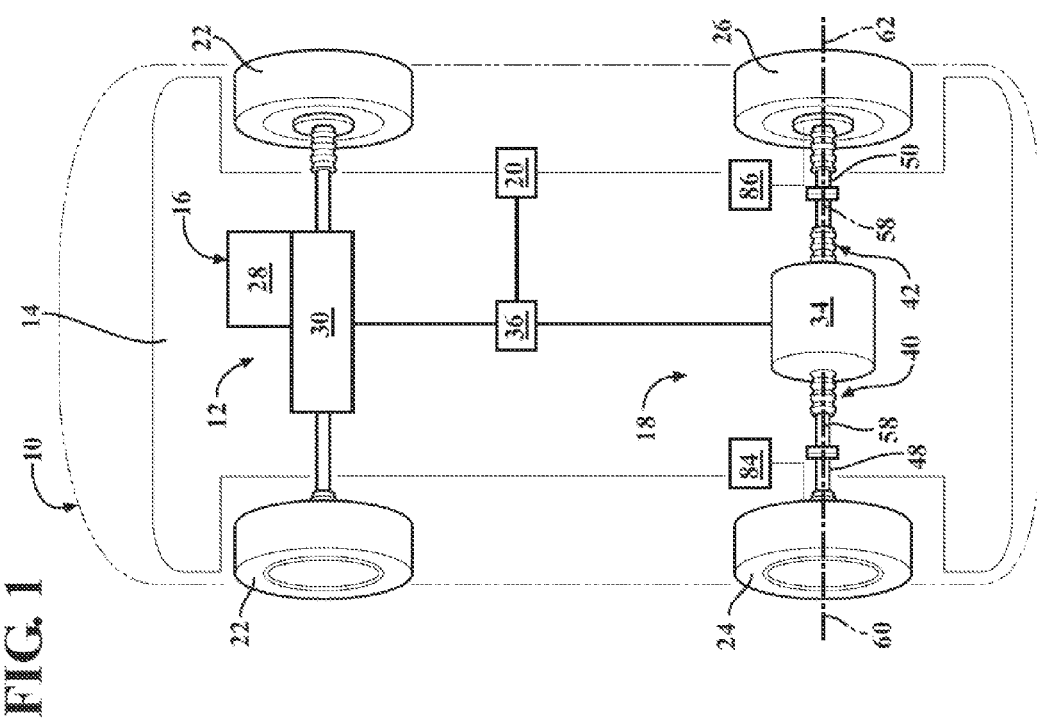
FIG. 1 is a schematic bottom perspective view of a vehicle illustrating a hybrid powertrain having a front drivetrain and a rear drivetrain for propelling the hybrid vehicle.

Referring to the drawings, wherein like reference numbers refer to like components, FIG. 1 shows a vehicle 10 having a powertrain 12. The vehicle 10 includes a chassis 14. The powertrain 12 includes a front drivetrain 16 and a rear drivetrain 18 that are each supported by the chassis 14. One, or both, of the front drivetrain 16 and the rear drivetrain 18 draws power from an energy storage device 20 to propel the hybrid vehicle 10. The energy storage device 20 is a battery, a fuel cell, an ultra-capacitor, and the like, which may be in addition to a standard accessory battery for powering accessories of the vehicle 10, such as headlamps, a radio, etc. The vehicle 10 includes a pair of front wheels 22 and a pair of rear wheels 24, 26. The rear wheels 24, 26 include a first rear wheel 24 and a second rear wheel 26. The front drivetrain 16 is operatively connected to the front wheels 22 to provide torque to the front wheels 22 and propel the vehicle 10. Likewise, the rear drivetrain 18 is operatively connected to the first rear wheel 24 and the second rear wheel 26 to provide torque to the rear wheels 24, 26 and propel the vehicle 10.

The front drivetrain 16 includes an engine 28 and a transmission 30. The rear drivetrain 18 includes an electric drive unit 34 (EDU). The energy storage device 20 is rechargeable and has sufficient electrical capacity to support functionality of the EDU 34. A controller 36 is operatively connected to the EDU 34 and the energy storage device 20. Since the powertrain 12 includes both an energy storage device 20 and engine 28, the powertrain 12 shown in the embodiment in FIG. 1 is a hybrid powertrain, and likewise, the vehicle 10 shown in the embodiment in FIG. 1 is a hybrid vehicle.

The EDU 34 is configured to selectively provide differing amounts of torque to each of the rear wheels 24, 26. Therefore, the EDU 34 replaces a mechanical differential that may otherwise be used. While the mechanical differential would only be able to differentiate rotational speed between the first and second rear wheels 24, 26, the independent operation of the rear wheels 24, 26 via the EDU 34 can allow for both speed and torque differentiation between the first and second rear wheels 24, 26. For speed differentiation, the first rear wheel 24 can rotate at a different speed than the second rear wheel 26. For example, when one or both of the rear wheels 24, 26 are on slippery pavement, the rotational speed of one or both of the rear wheels 24, 26 can be slowed down to improve traction between the rear wheel(s) 24, 26 and the pavement. For torque differentiation, a different torque can be applied to the first and second rear wheels 24, 26 to achieve torque vectoring, using a single motor 38. Torque vectoring allows the simultaneous application of a first chosen torque to one of the rear wheels 24, 26 and a second chosen torque in the same direction to the other rear wheel 24, 26. When the action of the EDU 34 is combined with selective action of vehicle service brakes (not shown), torque vectoring can include both positive and negative torque , i.e., accelerating one of the rear wheels 24, 26, while decelerating the other one of the rear wheels 24, 26.

Figure 2:
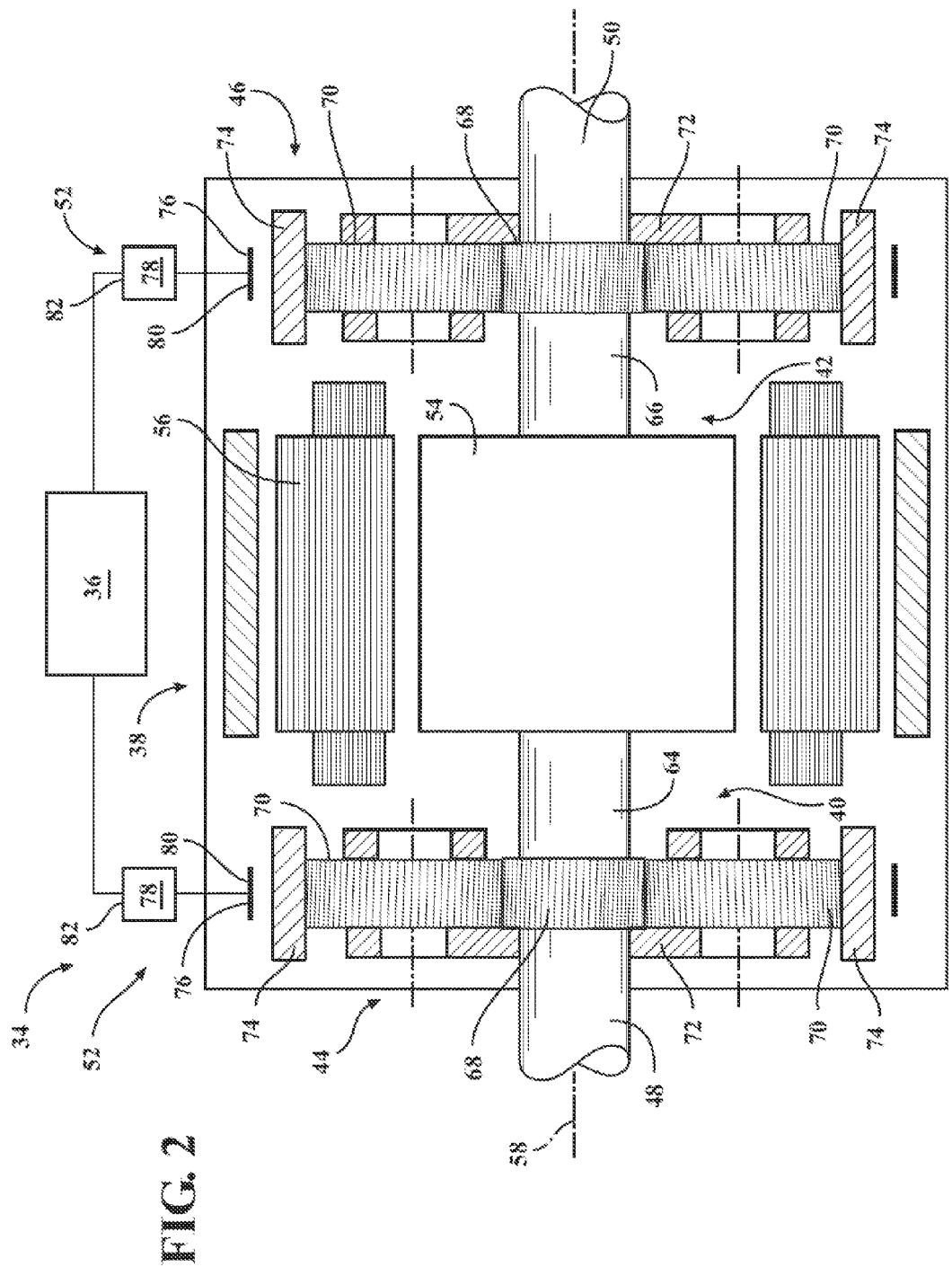
FIG. 2 is a partial cross-sectional view of an electric drive unit (EDU) of the rear drivetrain of FIG. 1.

Referring to FIG. 2, the EDU 34 includes an electric motor-generator 38, a first and a second output 40, 42, a first and a second planetary gear set 44, 46, a first and a second driveshaft 48, 50, and a pair of engagement mechanisms 52. The electric motor-generator 38 is a motor 38 that includes a rotor 54 and a stator 56. The EDU 34 draws power from the energy storage device 20 to selectively provide torque at least one of the rear wheels 24, 26, in response to a signal received from the controller 36. In other words, the controller 36 is configured to control the flow of power between the EDU 34 and the energy storage device 20. The stator 56 radially surrounds the rotor 54 about a drive axis 58. The rotor 54 is configured for rotation, relative to the stator 56, about the drive axis 58. The first output 40 and the second output 42 each axially extend from the rotor 54, along the drive axis 58, in opposition to one another. Therefore, the rotor 54 is axially disposed between the first output 40 and the second output 42, along the drive axis 58. The first output 40 is operatively attached to the first rear wheel 24 and the second output 42 is operatively attached to the second rear wheel 26 to selectively rotate the first wheel along a first rolling axis 60 and rotate the second rear wheel 26 along a second rolling axis 62.

The first planetary gear set 44 is operatively connected to the rotor 54, via the first output 40, and the second planetary gear set 46 is operatively connected to the rotor 54 via the second output 42. The first and second planetary gear sets 44, 46 are configured to rotate about the drive axis 58 in response to rotation of the rotor 54 about the drive axis 58.

The first output 40 may include a first motor shaft 64 and the second output 42 may include a second motor shaft 66. Each motor shaft 64, 66 may include a sun gear 68, which is in meshing relationship with the rest of the respective planetary gear set 44, 46. Therefore, rotation of the motor shaft 64, 66 causes the respective sun gear 68 to drive the corresponding first and second planetary gear set 44, 46 about the drive axis 58.

Each planetary gear set 44, 46 includes a plurality of planet gears 70 in meshing relationship with the sun gear 68. Each planet gear 70 is rotatably attached to a carrier 72. A ring gear 74 radially surrounds the planet gears 70, such that the planet gears 70 are also in meshing relationship with the ring gear 74. The first driveshaft 48 is rotatably connected to the carrier 72 of the first planetary gear set 44 and the second driveshaft 50 is rotatably connected to the carrier 72 of the second planetary gear set 46. The first and second driveshafts 48, 50 are each rotatably connected to the respective first and second rear wheel 24, 26. Therefore, rotation of the carrier 72 about the drive axis 58, causes a corresponding rotation of the first and/or second rear wheel 24, 26.

With continued reference to FIG. 2, the engagement mechanisms 52 are each configured to selectively engage the respective ring gear 74 to prevent, or otherwise limit, rotation of the ring gear 74 about the drive axis 58. When the engagement mechanism 52 is engaged with the ring gear 74, rotation of the ring gear 74 about the drive axis 58, relative to the rotation of the rotor 54, may be slowed or may be completely stopped. As a result, the corresponding carrier 72 is then caused to rotate relative to the respective ring gear 74, causing torque to be transmitted to the corresponding driveshaft 48, 50, and to the corresponding rear wheel 24, 26. The ability to vary the torque applied to the ring gear 74, by the use of engagement mechanism 52, allows the torque to the respective rear wheel 24, 26 to be selectively controlled. Likewise, in the absence of engagement of the ring gear 74 by the of the engagement mechanism 52, the ring gear 74 is free to rotate about the drive axis 58, at roughly the same rotational speed as the rotor 54, while the carrier 72 is free to rotate with respect to the drive axis 58. In this instance, since torque is not applied to the ring gear 74, torque is not transmitted to the corresponding rear wheel 24, 26. However, if the engagement mechanism 52 only partially engages the respective ring gear 74, the speed of rotation of the ring gear 74 may be reduced to less than the speed of rotation of the rotor 54, the carrier 72 may rotate at a rotational speed which is less than if the ring gear 74 were completely unrestrained and rotating at the speed of the rotor 54. As such, selective application of the engagement mechanisms 52 can be used to allow the speed of the corresponding rear wheel 24, 26 to vary from the speed of the other rear wheel 24, 26 and to control the amount of torque that is transmitted to the corresponding rear wheel 24, 26. More specifically, the torque applied to each rear wheel 24, 26 is proportional to the torque applied to the ring gear 74 by the engagement mechanism 52, provided that sufficient torque is applied by the rotor 54 to simultaneously provide sufficient torque to each sun gear 68. Alternately, the output torque applied to one of the wheels 24, 26, such as the left wheel 24, may be proportional to the torque applied to the ring gear 74 by the engagement mechanism 52, while the output torque applied to the other of the two wheels 24, 26, such as the right wheel 26, is then proportional to the difference between the torque applied by the rotor 54 and the amount of torque absorbed by the sun gear 68 that is driving the planetary gear set 44 connected to the one wheel 24, 26. Accordingly, as explained in more detail below, each engagement mechanism 52 may be independently controlled to vary the torque transmitted to the corresponding rear wheel 24, 26.

The engagement mechanism 52 may include a slip element 76 and an actuator 78. The actuator 78 is operatively connected to the controller 36 and the slip element 76 is operatively connected to the actuator 78. The actuator 78 is configured to actuate in response to receiving a signal from the controller 36. The slip element 76 may be a clutch brake. More specifically, the clutch brake may be a wet or dry plate clutch, a magnetic particle clutch, a magneto-rheological-fluid clutch, a band brake 80, as shown in FIG. 2, a multi-wrap band brake, and the like. The slip element 76 may be preferably controlled by the actuator 78, i.e., by electric current flowing through a coil. For instance, in the case of the band brake 80, a "floating" solenoid 82 can be used to pull the ends of the band toward one another, and so that the combination of band brake 80 and solenoid 82 has the same gain forwards and backwards, as is known by those of skill in the art of braking mechanisms. Rotation of the ring gears 74 about the drive axis 58 may be held by the controlled slip element 76. Unequal torques may then be transmitted to the rear wheels 24, 26. The torque may be applied to the engagement mechanism 52, via the corresponding solenoid 82. Each slip element 76 may act as a torque limiter to provide for braking events which would otherwise produce very high torque upon the motor-generator and gearing, such as braking events that take place with the wheels 24, 26 on slippery surfaces. That is, the maximum torque that is transmitted from the driveshaft 48, 50 through each planetary gear set 44, 46 to act on the inertia of the rotor 54 is limited by the maximum torque that is transmitted from the ring gear 74 to the engagement mechanism 52. The torque-limiting slip function is provided because a large fraction of the maximum torque that may be produced by the brakes can otherwise be applied to the drive train, which would be far in excess of the capability of the drive train, to provide torque itself Each sun gear 68 may be integral with the respective motor 38 shaft, which may be solid or include only an oil hole along its drive axis 58. As such, that the sun gears 68 may be of minimum diameter and the planetary gear sets 44, 46 may be of sufficient ratio for a small motor-generator to supply sufficient propulsion and regenerative braking torque to both rear wheels 24, 26 simultaneously. The first and second planetary gear sets 44, 46 may be single-stage, high-ratio planetary gear sets 44, 46 which require a very small sun gear 68 to have a practical overall diameter, low mechanical spin losses, and be light weight. Therefore, a small sun gear diameter could not have a hole in its center to accommodate an axle and a co-axial arrangement with a single motor, single gear set, and a differential to both axles would therefore be impractical. Although it would be possible to construct an EDU 34 with similar function using parallel-axis gearing and rotating clutches on each side (not shown), the use of planetary gear sets 44, 46, as shown in the embodiment in FIG. 2, has the advantages of allowing the use of non-rotating band brakes 80, which are easier to actuate, as parts of the engagement mechanisms 52 and of allowing a coaxial arrangement of motor 38 and drive shafts 48, 50 on the same drive axis 58, which is relatively compact and allows more space for cargo, passengers, or other components in the hybrid vehicle 10.

In one embodiment, a first speed sensor 84 is operatively connected to the first rear wheel 24 for sensing a rotational speed of the first rear wheel 24. A second speed sensor 86 is operatively connected to the second rear wheel 26 for sensing a rotational speed of the second rear wheel 26. In response to sensing the rotational speeds of each of the rear wheels 24, 26, one or both of the torques applied to the rear wheels 24, 26 can be changed to meet conditions of the road. For example, when one or more of the wheels 24, 26 are on slippery pavement and the rotational speed between the first and second rear wheels 24, 26 are different, as sensed by the first and/or second speed sensors 84, 86, a signal may be sent from the controller 36 to the corresponding engagement mechanism 52 to reduce torque to the rear wheel 24, 26 that has the higher speed and therefore may have lost traction with the pavement. The signal would serve to divert torque from the motor 38 to the rear wheel 24, 26 that has traction with the pavement to propel the hybrid vehicle 10, while not accelerating the rotation of the other rear wheel 24, 26 that is on the slippery pavement.

In another embodiment, the rear drivetrain 18 may be used to improve fuel economy of the hybrid vehicle 10 by launching the hybrid vehicle 10 from a stop using only the motor 38, before activating the front drivetrain 16. After the hybrid vehicle 10 is launched, the motor 38 may or may not be deactivated. For instance, the hybrid vehicle 10 may be driven by the rear drivetrain 18, including the EDU 34, using electric power supplied by the battery 20 through the controller 36, without the action of the front drivetrain 16, including the engine 28, under those conditions where it would be less efficient to operate the engine than to recharge the battery 20, whether with the engine or some outside source, at some later time.

In one embodiment, the motor 38 is an induction motor. One type of induction motor is 3-phase AC induction motor where power is supplied to a rotating device within the induction motor by electromagnetic induction. It should be appreciated that the motors is not limited to being induction motor, but may be any type of motor known to those of skill in the art. Alternately, the motor 38 may have a rotor 54 equipped with strong permanent magnets on its surface or embedded within its surface, and the engagement mechanisms 52 may be used to allow the wheels 24, 26 to rotate at high speeds without spinning the rotor 54, to limit drag losses in the powertrain 12 that would otherwise be caused by high-speed rotation of a motor including strong permanent magnets.

In addition to using the motor 38 to drive the rear wheels 24, 26 to propel the hybrid vehicle 10, the motor 38 may be operated to decelerate the vehicle 10 by reducing the rotational velocity of the rear wheels 24, 26. In this embodiment, the motor 38 may be configured as a generator to generate power to recharge the energy storage device 20 i.e., "regenerative braking". As the motor 38 is operated to decelerate rotation of the rear wheels 24, 26, electric energy is generated within the motor 38. That is, the motor 38 is acting as a generator to retard the vehicle. Kinetic energy that is associated with the motion of the hybrid vehicle 10 is converted to electrical energy within the motor 38. The controller 36 may be disposed between the motor 38 and the energy storage device 20. One of the functions of the controller 36, or a separate converter (not shown), is to convert the AC electrical energy within the motor 38 to DC power for the energy storage device 20. The electrical energy flows from the motor 38 and is absorbed into the energy storage device 20 as DC power to recharge the energy storage device 20. The controller 36 may also be disposed within the hybrid vehicle 10 to sense or receive a signal that the rotational speed of one or both of the rear wheels 24, 26 needs to be reduced. The controller 36 or a separate inverter (not shown), may operate to invert DC power from the energy storage device 20 to AC power that is required to operate the motor 38. The controller 36 or a separate inverter (not shown) may operate to invert DC power from the energy storage device 20 to AC power that is required to operate components such as a motor (not shown) coupled to the engine 28 or within the transmission 30.

Additionally, if the torque to the rear wheels 24, 26 becomes too great, i.e., both rear wheels 24, 26 are operating on ice, a finite amount of frictional torque between the engagement mechanism 52 and the corresponding ring gear 74 is allowed. As such, the ring gear 74 is allowed to slip, relative to the engagement mechanism 52, to lower the deceleration of the motor 38 during sudden stoppage of the rear wheels 24, 26, i.e., application of the brakes of the vehicle. Alternatively, the controller 36 can be configured to reduce the rate of application of the brakes or to vary the torque applied by the motor 38 when the torque on the outputs 40, 42 gets too high.

In one embodiment, with reference to FIG. 1, the EDU 34 may be provided in the hybrid vehicle 10 to respond to slipping between the rear wheels 24, 26 and the pavement. In this embodiment, the engagement mechanism 52 may be configured such that the slip element 76 does not engage the ring gear 74, unless the actuator 78 is actuated.

Figure 3:
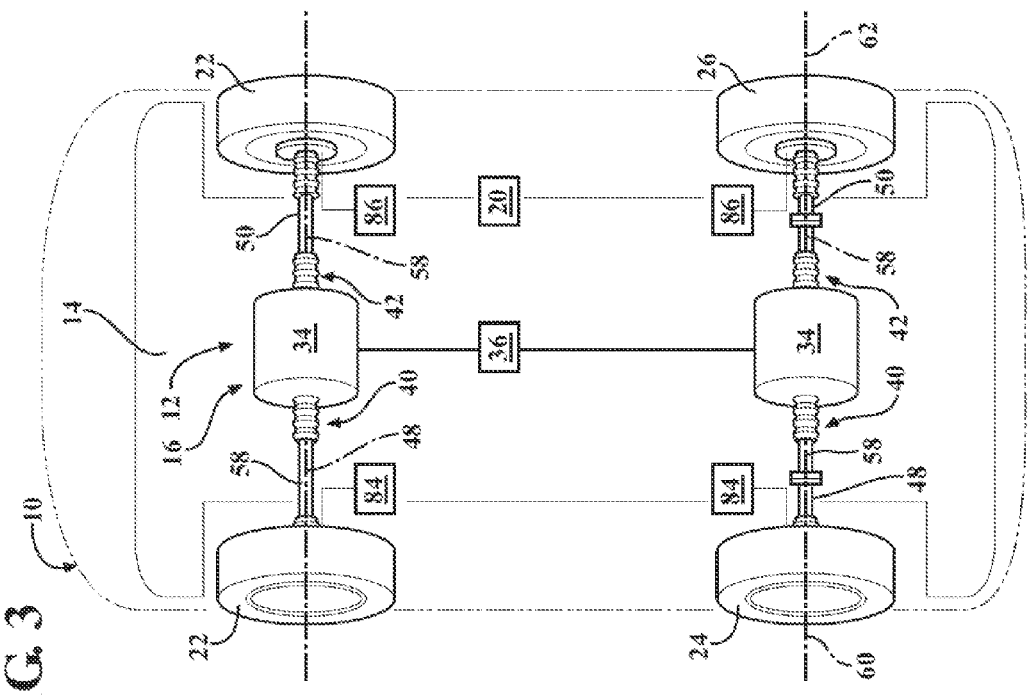
FIG. 3 is a schematic partial cross-sectional view of another embodiment of the vehicle of FIG. 1 illustrating the front drivetrain and the rear drivetrain each including the EDU of FIG. 2.

In another embodiment, with reference to FIG. 3, the front drivetrain 16 and the rear drivetrain 18 may each include an EDU 34 to selectively supply torque to one or more of the front and/or rear wheels 22, 24, 26 of the vehicle. In this embodiment, the vehicle 10 may be a fully electric vehicle 10, not including an engine, or a hybrid vehicle, including an engine (not shown), and the only source of mechanical propulsion for the vehicle 10 may be the EDU 34. Therefore, the front wheels 22 may also be operatively attached to respective speed sensors 84, 86. Alternatively, a fully electric vehicle 10 may be provided that only includes a front drivetrain 16 having an EDU 34 or a rear drivetrain 18 having an EDU 34. In these embodiments, the engagement mechanisms 52 may be configured such that the slip element 76 is constantly engaging the ring gear 74, unless the actuator 78 is actuated to reduce or to cease engagement of the ring gear 74. As such, by default, torque is constantly applied to the respective wheel(s) 22, 24, 26, unless the actuator 78 is actuated. The slip element 76 may be biased into constant engagement with the ring gear 74 via a spring element (not shown) and the like.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An electric drive unit configured for driving a first wheel and a second wheel of a vehicle, the electric drive unit comprising:
  a rotor;
  a stator radially surrounding the rotor about a drive axis;
  wherein the rotor rotates about the drive axis, relative to the stator;
  a first planetary gear set operatively connected to the rotor and rotatable about the drive axis in response to rotation of the rotor about the drive axis to transmit torque to the first wheel;
  a second planetary gear set operatively connected to the rotor, opposite the first planetary gear set, and rotatable about the drive axis in response to rotation of the rotor about the drive axis to transmit torque to the second wheel;
  wherein the first and second planetary gear sets each include:
    a carrier configured to be rotatably connected to a respective one of the first and second wheels;
    a plurality of planetary gears operatively supported by the carrier; and
    a ring gear radially surrounding the planetary gears, such that the planetary gears are in meshing relationship with the ring gear;
  a first motor shaft rotatably extending along the drive axis and operatively connecting the rotor to the first planetary gear set;
  a second motor shaft rotatably extending along the drive axis and operatively connecting the rotor to the second planetary gear set;
  wherein each of the first and second motor shafts include a sun gear; and
  wherein the sun gear of the first motor shaft is in meshing engagement with the planetary gears of the first planetary gear set and the sun gear of the second motor shaft is in meshing engagement with the planetary gears of the second planetary gear set;
  wherein the rotor is operatively disposed along the drive axis between the first planetary gear set and the second planetary gear set;
  wherein rotation of the rotor causes each of the first and second planetary gear sets to rotate about the drive axis; and
  a pair of engagement mechanisms;
  wherein each engagement mechanism is configured to selectively engage a respective one of the first and second planetary gear sets to vary the torque transmitted to the respective first wheel and second wheel.

2. The electric drive unit, as set forth in claim 1, wherein each engagement mechanism includes a slip element; and
  wherein the slip element is configured to selectively engage the ring gear of the respective planetary gear set to vary the torque transmitted to the respective wheel.

3. The electric drive unit, as set forth in claim 2, wherein each engagement mechanism includes an actuator operatively connected to the respective slip element; and
  wherein the actuator is configured to be selectively actuated to cause the slip element to engage the respective ring gear.

4. A vehicle comprising:
  a first wheel and a second wheel;
  a controller configured for transmitting a signal; and
  an electric drive unit having:
    a rotor;
    a stator radially surrounding the rotor;
    wherein the rotor rotates relative to the stator;
    a first planetary gear set operatively connected to the rotor and rotatable about a drive axis in response to rotation of the rotor to transmit torque to the first wheel;
    a second planetary gear set operatively connected to the rotor, opposite the first planetary gear set, and rotatable about the drive axis in response to rotation of the rotor to transmit torque to the second wheel;
    wherein the first and second planetary gear sets each include:
      a carrier configured to be rotatable connected to a respective one of the first and second wheels;
      a plurality of planetary gears operatively supported by the carrier; and
      a ring gear radially surrounding the planetary gears, such that the planetary gears are in meshing relationship with the ring gear;
    a first motor shaft rotatably extending along the drive axis and operatively connecting the rotor to the first planetary gear set;
    a second motor shaft rotatably extending along the drive axis and operatively connecting the rotor to the second planetary gear set
    wherein each of the first and second motor shafts include a sun gear; and
    wherein the sun gear of the first motor shaft is in meshing engagement with the planetary gears of the first planetary gear set and the sun gear of the second motor shaft is in meshing engagement with the planetary gears of the second planetary gear set wherein the rotor is operatively disposed between the first planetary gear set and the second planetary gear set;

wherein rotation of the rotor causes each of the first and second planetary gear sets to rotate about the drive axis; and a pair of engagement mechanisms operatively connected to the controller;

wherein each engagement mechanism is configured to selectively engage a respective one of the first and second planetary gear sets to vary the torque transmitted to the respective first wheel and second wheel in response to receiving a signal from the controller.

5. The vehicle, as set forth in claim 4, wherein each engagement mechanism includes a slip element; and wherein the slip element is configured to selectively engage the ring gear of the respective planetary gear set to vary the torque transmitted to the respective wheel.

6. The vehicle, as set forth in claim 5, wherein each engagement mechanism includes an actuator operatively connected to the respective slip element; and wherein the actuator is configured to be selectively actuated to cause the slip element to engage the respective ring gear.

7. The vehicle, as set forth in claim 4, further comprising:

a first driveshaft rotatably connecting the carrier of the first planetary gear set to the first wheel; and a second driveshaft rotatably connecting the carrier of the second planetary gear set to the second wheel;

wherein the first driveshaft transmits torque to the first wheel in response to rotation of the carrier of the first planetary gear set and the second driveshaft transmits torque to the second wheel in response to rotation of the carrier of the second planetary gear set.

8. The vehicle, as set forth in claim 4, further comprising an energy storage device operatively connected to the controller and the electric drive unit;

wherein the energy storage device is configured for supplying power to the electric drive unit in response to receiving a signal from the controller.

* * * * *